US011983681B2

(12) United States Patent
Hardee et al.

(10) Patent No.: US 11,983,681 B2
(45) Date of Patent: May 14, 2024

(54) SYSTEMS AND METHODS OF MONITORING A CHARACTERISTIC OF A WASTE CONTAINER OPERATION VIA A SENSOR NODE CO-LOCATED WITH A WASTE CONTAINER

(71) Applicants: Drew Hardee, Clayton, NC (US); Edward Roney, IV, Clayton, NC (US)

(72) Inventors: Drew Hardee, Clayton, NC (US); Edward Roney, IV, Clayton, NC (US)

(\*) Notice: Subject to any disclaimer, the term of this patent is extended or adjusted under 35 U.S.C. 154(b) by 423 days.

(21) Appl. No.: 17/360,989

(22) Filed: Jun. 28, 2021

(65) Prior Publication Data

US 2022/0164778 A1    May 26, 2022

Related U.S. Application Data

(60) Provisional application No. 63/044,640, filed on Jun. 26, 2020.

(51) Int. Cl.
*G06Q 10/30* (2023.01)
*B65F 1/14* (2006.01)

(52) U.S. Cl.
CPC ............ *G06Q 10/30* (2013.01); *B65F 1/14* (2013.01); *B65F 2210/128* (2013.01); *B65F 2210/168* (2013.01)

(58) Field of Classification Search
CPC .................... G06Q 10/30; B65F 2210/128
See application file for complete search history.

(56) References Cited

U.S. PATENT DOCUMENTS

2009/0161907 A1\* 6/2009 Healey .................. B65F 1/14
340/666
2020/0013024 A1\* 1/2020 Armstrong .......... G06Q 10/0631

\* cited by examiner

*Primary Examiner* — Julie M Shanker
(74) *Attorney, Agent, or Firm* — Kaufman & Canoles, P.C.

(57) ABSTRACT

Systems and methods of monitoring a characteristic of a waste container operation via a sensor node co-located with a waste container are provided. In one exemplary embodiment, a method performed by a first network node comprises receiving, by the first network node, from the sensor node, an image representing a perspective view of an interior of the container, the first network node being operable to estimate an available capacity of the container to hold waste based on that image so that a second network node is operable to schedule a task associated with the available capacity of the container, with the image being obtained by an optical sensor operationally coupled to the sensor node, with the sensor being disposed on a side or corner of the container and having a viewing angle towards an opposite side or corner of the container.

13 Claims, 15 Drawing Sheets

1100

BY A SENSOR NODE CO-LOCATED WITH A WASTE CONTAINER, RECEIVE, FROM AN OPTICAL SENSOR OPERATIONALLY COUPLED TO THE SENSOR NODE, AN IMAGE REPRESENTING A PERSPECTIVE VIEW OF AN INTERIOR OF THE CONTAINER SO THAT A CURRENT AVAILABLE CAPACITY OF THE CONTAINER CAN BE DETERMINED BASED ON THAT IMAGE, WITH THE SENSOR BEING DISPOSED ON A SIDE OR CORNER OF THE CONTAINER WITH A VIEWING ANGLE TOWARDS AN OPPOSITE SIDE OR CORNER OF THE CONTAINER ⟵ 1101

PROCESS THE IMAGE TO AT LEAST REDUCE A MEMORY SIZE OF THE IMAGE ⟵ 1103

SEND, BY THE SENSOR NODE, TO A FIRST NETWORK NODE, THE IMAGE, THE FIRST NETWORK NODE BEING OPERABLE TO DETERMINE A CURRENT AVAILABLE CAPACITY OF THE CONTAINER BASED ON THE IMAGE ⟵ 1105

FIG. 11

SYSTEMS AND METHODS OF MONITORING A CHARACTERISTIC OF A WASTE CONTAINER OPERATION VIA A SENSOR NODE CO-LOCATED WITH A WASTE CONTAINER

CROSS REFERENCE TO RELATED APPLICATIONS

This application claims the benefit of U.S. Prov. App. No. 63/044,640, filed Jun. 26, 2020, which is hereby incorporated by reference as if fully set forth herein.

FIELD OF DISCLOSURE

The present disclosure relates generally to the field of waste container management, and in particular to systems and methods of monitoring a characteristic of a waste container operation via a sensor node co-located with a waste container.

BACKGROUND

Waste management typically requires the periodic removal of waste from a waste container (e.g., dumpster, recycling bin, roll-off container, curbside or alley container, or the like) at various collection sites. For instance, a truck can travel to a collection site carrying or towing an empty waste container, unload the empty container at the site, and then pick-up the container on a periodic basis (e.g., weekly, monthly, or the like), to empty its contents at a waste site (e.g., transfer station, waste processing facility, landfill, or the like). However, the periodic removal of a waste container may result in the container being overloaded with waste, which may result in waste overflowing the container, or underutilized.

Accordingly, there is a need for improved techniques for monitoring a characteristic of a container operation via a sensor node co-located with a waste container so that the container is collected without waste overflow or underutilization of the container. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiments of the present disclosure relate to systems and methods of monitoring a characteristic of a waste container operation via a sensor node co-located with a waste container. According to one aspect, a method performed by a first network node that is operable to monitor a characteristic of a waste container operation via a sensor node co-located with a waste container comprises receiving, by the first network node, from the sensor node, an image representing a perspective view of an interior of the container. Further, the first network node is operable to estimate an available capacity of the container to hold waste based on that image so that a second network node is operable to schedule a task associated with the available capacity of the container. The image is obtained by an optical sensor operationally coupled to the sensor node, with the sensor being disposed on a side or corner of the container and having a viewing angle towards an opposite side or corner of the container.

According to another aspect, the method further includes estimating the available capacity of the container based on the image.

According to another aspect, the step of estimating the available capacity includes processing, by a neural network of the first network node, the image to determine an estimate of the available capacity of the container. Further, the neural network is trained by a plurality of interior waste container images having different predetermined available capacities of waste.

According to another aspect, the step of processing the image is responsive to determining whether all or a portion of the viewing angle of the sensor towards an opposite side or corner of the container is blocked by waste disposed in the container.

According to another aspect, the task includes sending an indication that the container is full of waste.

According to another aspect, the task includes sending an indication that the waste disposed in the container can be emptied.

According to another aspect, the method further includes determining that all or a portion of the viewing angle of the sensor towards an opposite side or corner of the container is blocked by waste disposed in the container.

According to another aspect, the method further includes sending, by the first network node, to the second network node, an indication that all or a portion of the viewing angle of the sensor towards an opposite side or corner of the container is blocked by waste disposed in the container.

According to another aspect, the task includes sending an indication associated with all or a portion of the viewing angle of the sensor towards an opposite side or corner of the container is blocked by waste disposed in the container.

According to another aspect, the sensor is disposed on one end of an extendable arm of the sensor hub, with the sensor hub being operable to control the extendable arm so that the sensor can be extended by the extendable arm to obtain an overhead perspective view of the interior of the container with a downwards viewing angle towards an opposite side or corner of the container.

According to another aspect, the sensor hub is operable to extend the extendable arm responsive to determining that all or a portion of the viewing angle of the sensor towards an opposite side or corner of the container is blocked by waste disposed in the container.

According to another aspect, the sensor hub is operable to retract the extendable arm responsive to determining that none or a portion of the viewing angle of the sensor towards an opposite side or corner of the container is blocked by waste disposed in the container.

According to another aspect, the first and second network nodes are a same node.

According to one aspect, a first network node that is operable to monitor a characteristic of a waste container operation via a sensor node comprises processing circuitry and memory. Further, the memory contains instructions executable by the processing circuitry whereby the first network node is configured to receive, from the sensor node, an image representing a perspective view of an interior of the container. Further, the first network node is operable to estimate an available capacity of the container to hold waste based on that image so that a second network node is operable to schedule a task associated with the available capacity of the container. The image is obtained by an optical sensor operationally coupled to the sensor node, with the sensor being disposed on a side or corner of the container and having a viewing angle towards an opposite side or corner of the container.

According to one aspect, a method performed by a second network node that is operable to monitor a characteristic of a waste container operation via a sensor node co-located with a waste container comprises receiving, by the second network node, from a first network node, an indication of an estimated available capacity of the container to hold waste determined from an image representing a perspective view of an interior of the container. Further, the second network node is operable to schedule a task associated with the estimated available capacity of the container. The image is obtained by an optical sensor operationally coupled to the sensor node, with the sensor being disposed on a side or corner of the waste container with a viewing angle towards an opposite side or corner of the waste container.

According to one aspect, a second network node that is operable to monitor a characteristic of a waste container operation via a sensor node co-located with a waste container comprises processing circuitry and memory. Further, the memory contains instructions executable by the processing circuitry whereby the second network node is configured to receive, from a first network node, an indication of an estimated available capacity of the container to hold waste determined from an image representing a perspective view of an interior of the container. The second network node is operable to schedule a task associated with the available capacity of the container. Also, the image is obtained by an optical sensor operationally coupled to the sensor node. The sensor is disposed on a side or corner of the waste container with a viewing angle towards an opposite side or corner of the waste container.

According to one aspect, a method performed by a sensor node, co-located with a waste container, that is operable to monitor a characteristic of a waste container operation, comprises receiving, by the sensor node, from an optical sensor operationally coupled to the sensor node, an image representing a perspective view of an interior of the container so that a current available capacity of the container can be determined based on that image. Further, the sensor is disposed on a side or corner of the waste container with a viewing angle towards an opposite side or corner of the waste container.

According to one aspect, a sensor node, co-located with a waste container, that is operable to monitor a characteristic of a waste container operation, comprises processing circuitry and memory. Further, the memory contains instructions executable by the processing circuitry whereby the first network node is configured to receive, from an optical sensor operationally coupled to the sensor node, an image representing a perspective view of an interior of the waste container so that a current available capacity of the waste container can be determined based on that image. Further, the sensor is disposed on a side or corner of the waste container with a viewing angle towards an opposite side or corner of the waste container.

According to one aspect, a method performed by a sensor node, co-located with a waste container, that is operable to monitor a characteristic of a waste container operation, comprises sending, by the sensor node, to a first network node, an image captured by an optical sensor operationally coupled to the sensor node and representing a perspective view of an interior of a waste container. Further, the sensor is disposed on a side or corner of the waste container with a viewing angle towards an opposite side or corner of the waste container. Also, the first network node is operable to estimate an available capacity of the waste container to hold waste based on the image.

According to one aspect, a sensor node, co-located with a waste container, that is operable to monitor a characteristic of a waste container operation, comprises processing circuitry and memory. Further, the memory contains instructions executable by the processing circuitry whereby the first network node is configured to send, to a first network node, an image captured by an optical sensor operationally coupled to the sensor node and representing a perspective view of an interior of a waste container. The sensor is disposed on a side or corner of the waste container with a viewing angle towards an opposite side or corner of the waste container. Also, the first network node is operable to estimate an available capacity of the waste container to hold waste based on the image.

According to one aspect, a method performed by a client node that is operable to monitor a characteristic of a waste container operation via a sensor node co-located with a waste container, comprises receiving, by the client node, from a second network node, an indication to confirm a scheduled task associated with a waste container. The second network node is operable to schedule the task based on an available capacity of the container to hold waste. The available capacity of the container is determined from an image representing a perspective view of an interior of the container. Also, the image is obtained by an optical sensor operationally coupled to the sensor node. The sensor is disposed on a side or corner of the waste container with a viewing angle towards an opposite side or corner of the waste container.

According to one aspect, a client node that is operable to monitor a characteristic of a waste container operation via a sensor node co-located with a waste container, comprises processing circuitry and memory. Further, the memory contains instructions executable by the processing circuitry whereby the first network node is configured to receive, from a second network node, an indication to confirm a scheduled task associated with a waste container. The second network node is operable to schedule the task based on an available capacity of the container to hold waste. The available capacity of the container is determined from an image representing a perspective view of an interior of the container. The image is obtained by an optical sensor operationally coupled to the sensor node. Also, the sensor is disposed on a side or corner of the waste container with a viewing angle towards an opposite side or corner of the waste container.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 11 illustrates one embodiment of a method by a sensor node of monitoring a characteristic of a waste container operation in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Figure 1A:
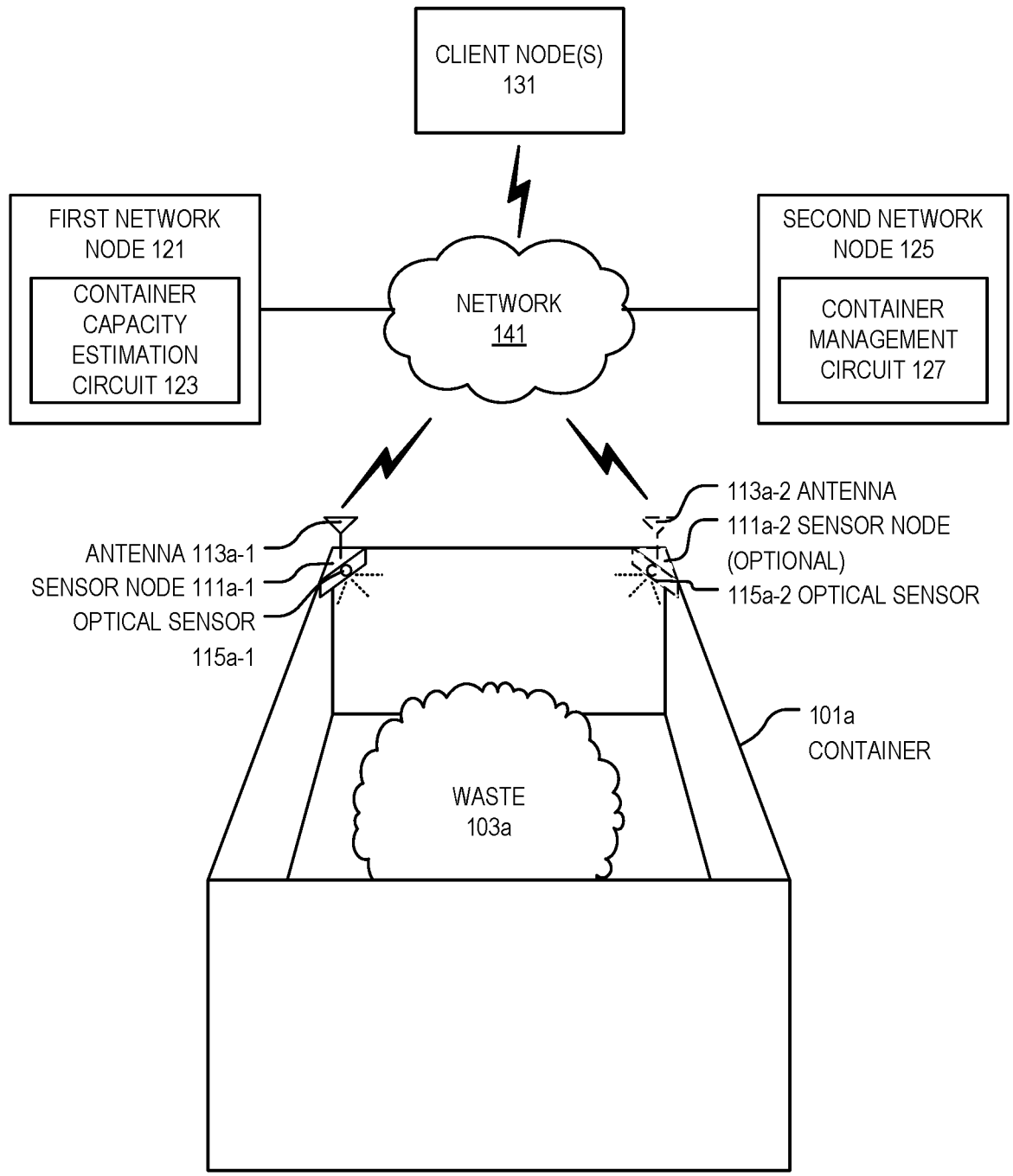
FIG. 1A illustrates one embodiment of a system of monitoring a characteristic of a waste container operation via a sensor node co-located with a waste container in accordance with various aspects as described herein.

In this disclosure, systems and methods of monitoring a characteristic of a waste container operation via a sensor node co-located with a waste container are provided. For example, FIG. 1A illustrates one embodiment of a system 100a of monitoring a characteristic of a waste container operation via a sensor node 111a-1, 111a-2 co-located with a waste container 101a in accordance with various aspects as described herein. In FIG. 1A, the system 100a includes the waste container 101a (e.g., dumpster), a first network node 121 (e.g., server), a second network node 125 (e.g., server), and a client node 131 (e.g., wireless device), all or a portion of which are communicatively coupled via network 141 (e.g., Internet, cellular, or the like). The waste container 101a includes one or more sensor nodes 111a-1, 111a-2, with each having an optical sensor 115a-1, 115a-2 (e.g., camera, infrared sensor, or the like) and an antenna 113a-1, 113a-2 associated with communication circuitry of each sensor node 111a-1, 111a-2 (not shown). Each sensor node 111a-1, 111a-2 receives, from a corresponding optical sensor 115a-1, 115a-2, an image representing a perspective view of an interior of the container 101a so that a current available capacity of the container 101a to hold waste can be determined based on that image. Further, each sensor node 111a-1, 111a-2 then send the captured image to the first network node 121. Each sensor node 111a-1, 111a-2 is disposed on a side or corner of the container 101a with a viewing angle towards an opposite side or corner of the container 101a.

In FIG. 1A, the first network node 121 includes a container capacity estimation circuit 123 that estimates an available capacity of the container 101a to hold waste based on an image received by the first network node 121 from each sensor node 111a-1, 111a-2. For example, the estimation circuit 123 processes, by a neural network (not shown), the image to determine an estimate of the available capacity of the container 101a to hold waste. Further, the neural network is trained by a plurality of interior waste container images having different predetermined available capacities of waste. The first network node 121 then sends, to the second network node 125, an indication of the estimated available capacity of the container 101a to hold waste.

In the current embodiment, the second network node 125 includes a waste container management circuit 127 that manages waste container operations for the container 101a. The second network node 125 receives the indication of the estimated available capacity of the container 101a to hold waste and in response, schedules a task associated with the available capacity of the container 101a. In one example, the second network node 125 schedules sending, to a client node 131, an indication that the container 101a is full of waste. In another example, the second network node 125 schedules sending an indication that waste disposed in the container 101a can be emptied. The second network node 125 can send any of these indications as a text message, email message, or the like to a client node 131. The second network node 125 then executes the scheduled task.

In another embodiment, the first network node 121 and the second network node 125 are the same node.

In another embodiment, the sensor node 111a-1, 111a-2 and the first network node 121 are the same node.

In another embodiment, the second network node 125 sends, to a client node 131, a first indication to confirm a scheduled task associated with the waste container 101a. In response to receiving the first indication, the client node 131 sends, to the second network node 125, a second indication that the scheduled task is confirmed. In response to the second indication, the second network node 125 schedules and executes the task.

Figure 1B:
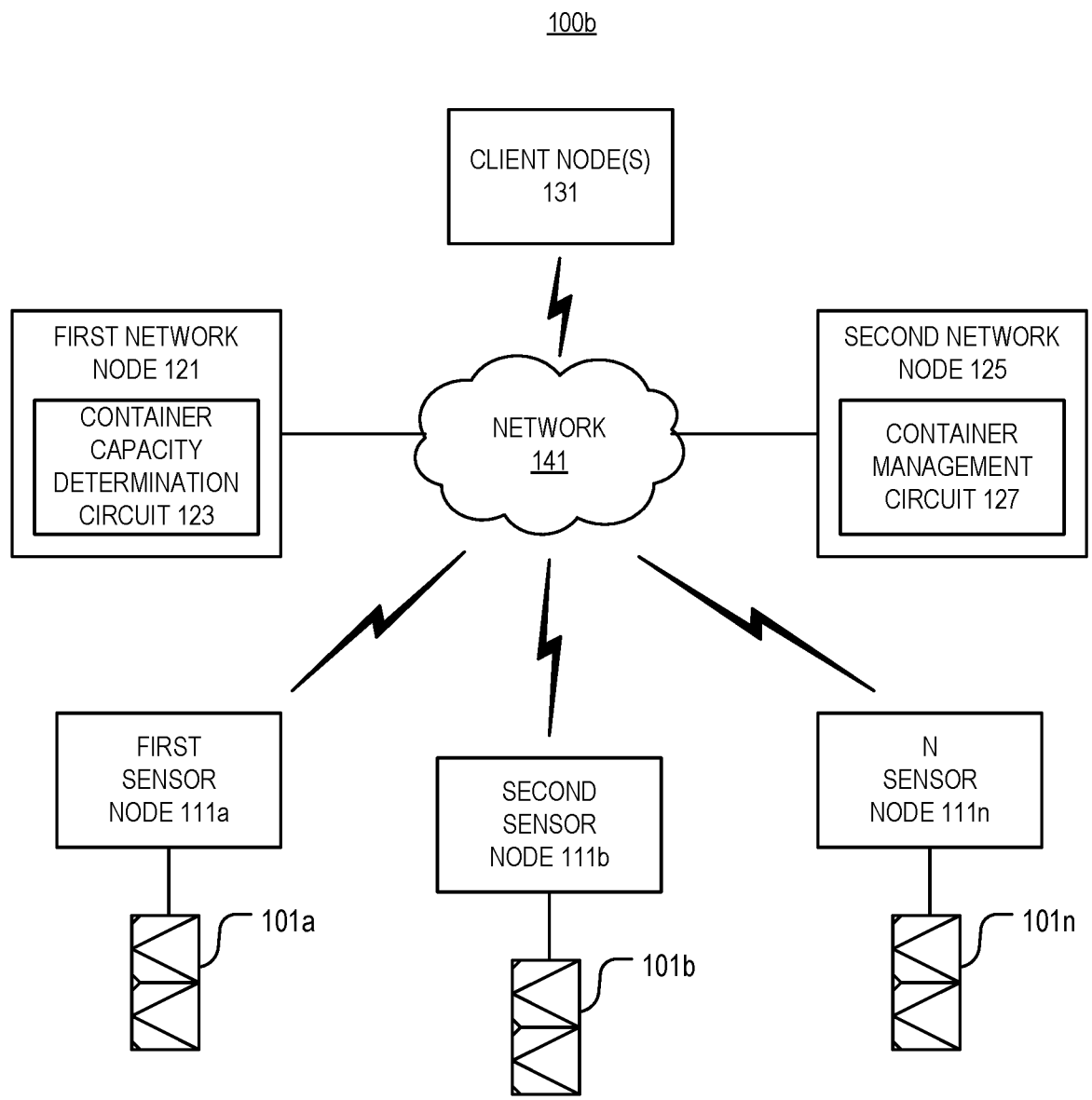
FIG. 1B illustrates another embodiment of a system of monitoring a characteristic of a waste container operation via a sensor node co-located with a waste container in accordance with various aspects as described herein.

FIG. 1B illustrates another embodiment of a system 100b of monitoring a characteristic of a waste container operation via a sensor node co-located with a waste container in accordance with various aspects as described herein. In FIG.

1B, the system 100b includes a plurality of waste containers 101a-n, with each having one or more sensor nodes 111a, 111b, 111n.

Figure 2:
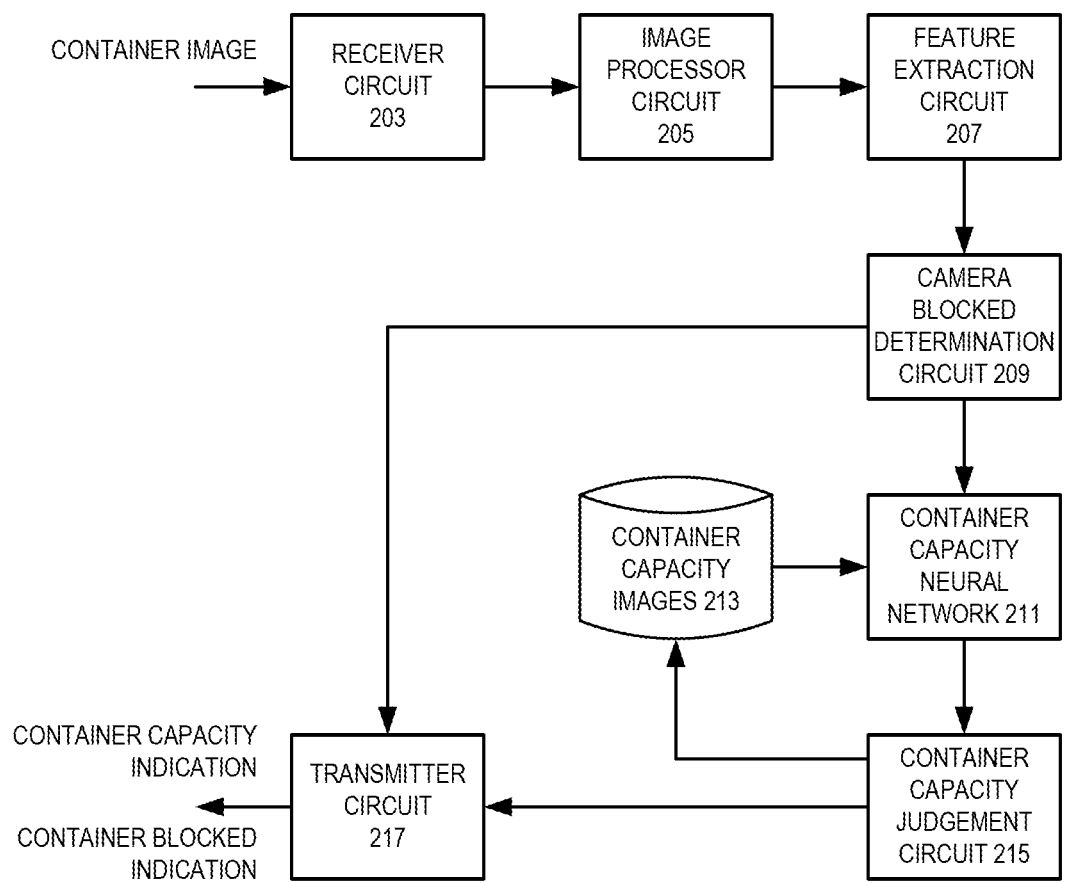
FIG. 2 illustrates one embodiment of a first network node in accordance with various aspects as described herein.

FIG. 2 illustrates one embodiment of a first network node 200 in accordance with various aspects as described herein. In FIG. 2, the first network node 200 implements various functional means, units, or modules (e.g., via the processing circuitry 310 in FIG. 3, via software code, or the like), or circuits. In one embodiment, these functional means, units, modules, or circuits (e.g., for implementing the method(s) herein) may include for instance: a receiver circuit 203 operable to receive, from a sensor node co-located with a waste container, an image representing a perspective view of an interior of the container; an image processor circuit 205 operable to pre-process the image; a feature extraction circuit 207 operable to extract or emphasize certain features of the image; a camera blocked determination circuit 209 operable to determine whether all or a portion of the viewing angle of the sensor towards an opposite side or corner of the container is blocked by waste disposed in the container; a waste container capacity neural network 211 operable to process the image to determine an estimate of the available capacity of the container to hold waste; a waste container capacity images database 213 operable to store a plurality of interior waste container images having different predetermined available capacities of waste, which are used to train the neural network 211; a waste container capacity judgement circuit 215 operable to determine a confidence level of the estimated available capacity of the container to hold waste; and a transmitter circuit 217 operable to transmit an indication of the estimate of the available capacity of the container to hold waste.

Figure 3:
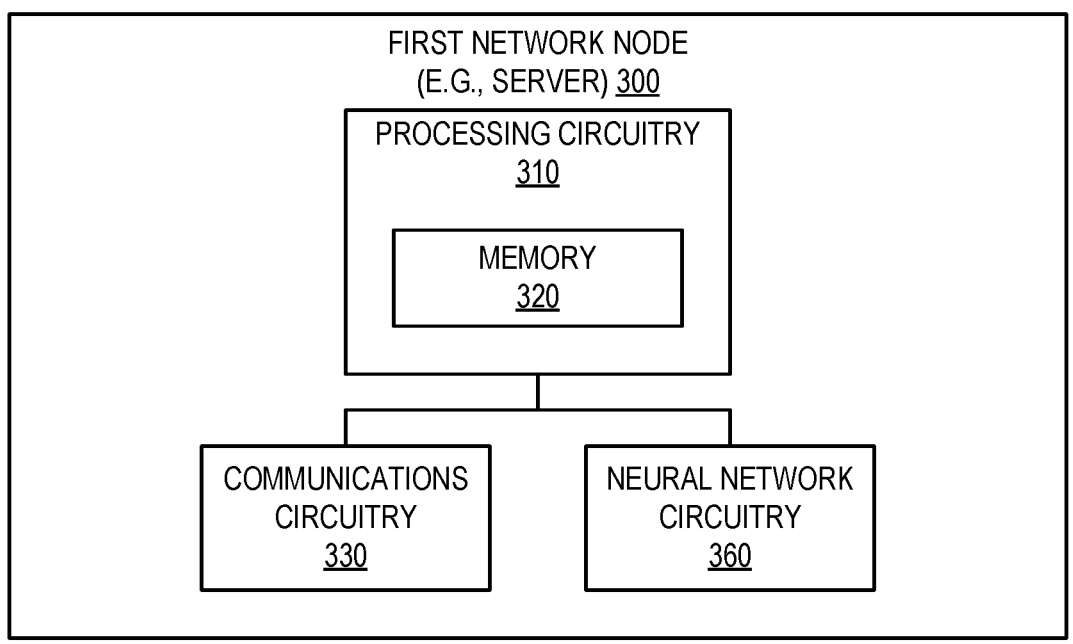
FIG. 3 illustrates another embodiment of a first network node in accordance with various aspects as described herein.

FIG. 3 illustrates another embodiment of a first network node 300 in accordance with various aspects as described herein. In FIG. 3, the first network node 300 includes processing circuitry 310 that is operably coupled to one or more of the following: communications circuitry 330 and neural network circuitry 360, the like, or any combination thereof. The communication circuitry 330 is configured to transmit and/or receive information to and/or from one or more other nodes via any communication technology. The processing circuitry 310 is configured to perform processing described herein, such as by executing instructions stored in memory 320. The processing circuitry 310 in this regard may implement certain functional means, units, or modules.

Figure 4:
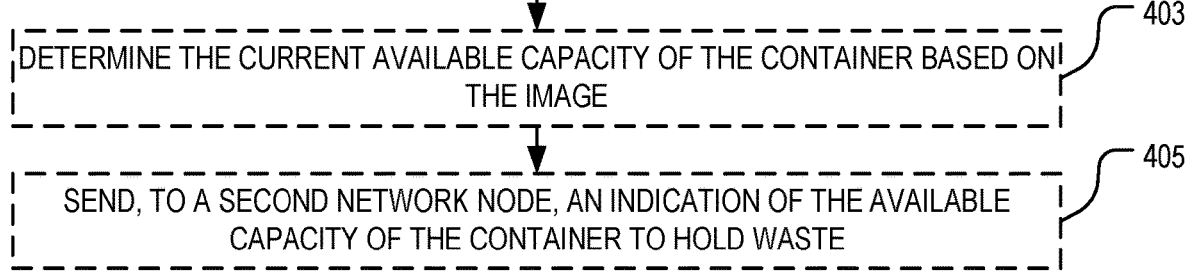
FIG. 4 illustrates one embodiment of a method by a first network node of monitoring a characteristic of a waste container operation via a sensor node co-located with a waste container in accordance with various aspects as described herein.

FIG. 4 illustrates one embodiment of a method 400 by a first network node of monitoring a characteristic of a waste container operation via a sensor node co-located with a waste container in accordance with various aspects as described herein. In FIG. 4, the method 400 may start, for instance, at block 401 where it includes receiving, from a sensor node co-located with a waste container, an image representing a perspective view of an interior of the container. Further, the first node is operable to determine an available capacity of the container to hold waste based on that image. The image is obtained by an optical sensor operationally coupled to the sensor node. Also, the sensor is disposed on a side or corner of the container with a viewing angle towards an opposite side or corner of the dumpster. At block 403, the method 400 may include determining the current available capacity of the container based on the image. At block, 405, the method 400 may include transmitting, to a second network node, an indication of the available capacity of the container to hold waste.

Figure 5:
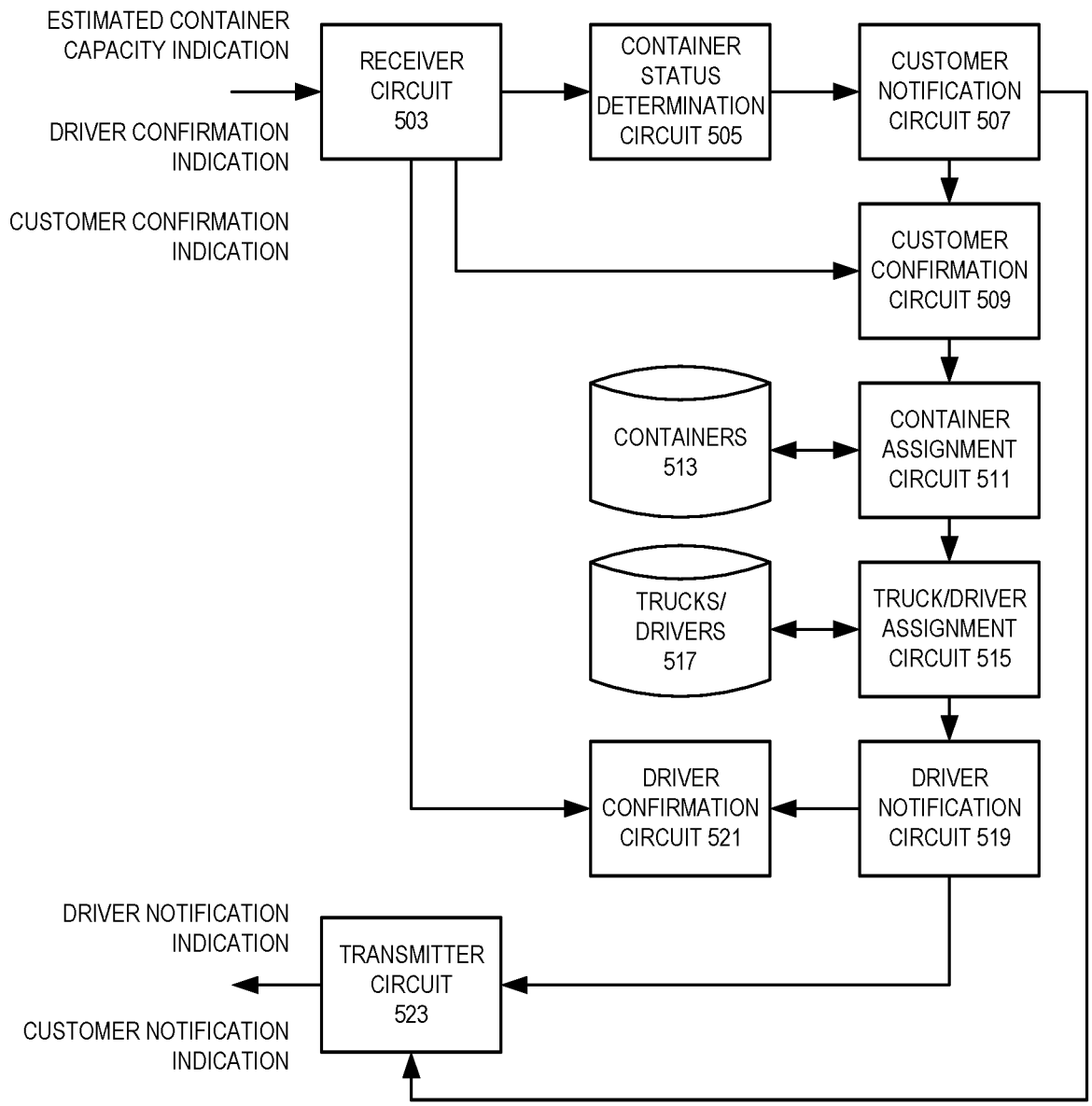
FIG. 5 illustrates one embodiment of a second network node in accordance with various aspects as described herein.

FIG. 5 illustrates one embodiment of a second network node 500 in accordance with various aspects as described herein. In FIG. 5, the second network node 500 includes a receiver circuit 503, a waste container status determination circuit 505, a customer notification circuit 507, a customer confirmation circuit 509, a waste container assignment circuit 511, a waste container database 513, a truck/driver assignment circuit 515, a truck/driver database 517, a driver notification circuit 519, a driver confirmation circuit 521, and a transmitter circuit 523. The receiver circuit 503 is operable to receive, from a first network node, an estimated available capacity of a waste container to hold waste. The waste container status determination circuit 505 is operable to determine the status (e.g., empty, partially filled, full, or the like) of the container based on its estimated available capacity.

In FIG. 5, the customer notification circuit 507 is operable to send a notification of the status of the container to a client device associated with a customer. In one example, the waste container status determination circuit 505 determines that the container associated with a certain customer is full based on the estimated container capacity indication. In response to the container being indicated as full, the customer notification circuit 507 sends an indication, to a client node associated with that customer, that the container is full and ready to be picked up so that the waste can be emptied from the container. In another example, the customer notification circuit 507 sends, to the client node associated with that customer, a first indication that the container is full and a second indication of whether the container should be picked-up so that the waste can be emptied from the container.

In the current embodiment, the customer confirmation circuit 509 is operable to confirm whether the container should be picked-up responsive to receiving, from the client node associated with that customer, an indication that the container should be picked up. The container assignment circuit 511 is operable to assign a waste container to a customer based on the container database 513. The truck/driver assignment circuit 515 is operable to assign a truck and a driver for delivery/pick-up of an assigned waste container based on the trucks/drivers database 517. The driver notification circuit 519 is operable to notify the assigned driver of the assigned container, assigned truck, a waste container delivery location, a delivery date/time, a waste disposal location, a waste disposal delivery date/time, the like, or any combination thereof. The driver confirmation circuit 521 is operable to confirm the notification with the assigned driver. The transmitter circuit 523 is operable to send notifications to the assigned driver and the client device of a customer.

Figure 6:
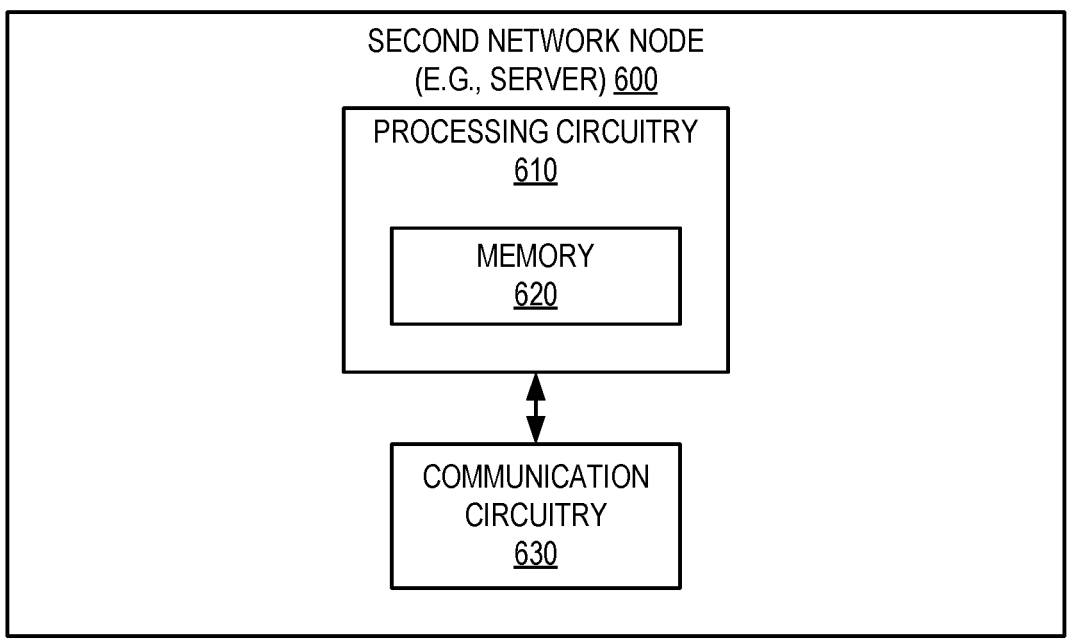
FIG. 6 illustrates another embodiment of a second network node in accordance with various aspects as described herein.

FIG. 6 illustrates another embodiment of a second network node 600 in accordance with various aspects as described herein. In FIG. 6, the second network node 600 includes processing circuitry 610 that is operably coupled to one or more of the following: communications circuitry 630, or the like. The communication circuitry 630 is configured to transmit and/or receive information to and/or from one or more other nodes via any communication technology. The processing circuitry 610 is configured to perform processing described herein, such as by executing instructions stored in memory 620. The processing circuitry 610 in this regard may implement certain functional means, units, or modules.

Figure 7:
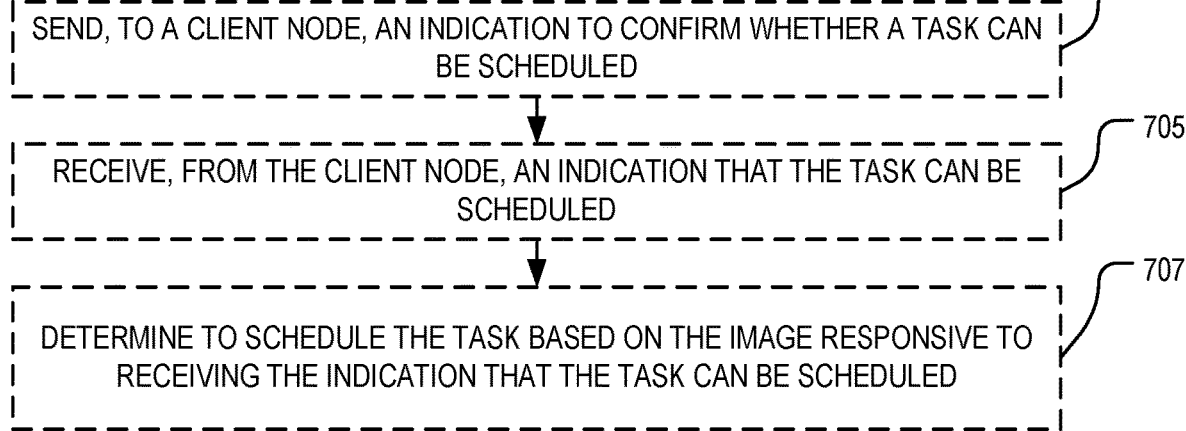
FIG. 7 illustrates one embodiment of a method by a second network node of monitoring a characteristic of a waste container operation via a sensor node co-located with a waste container in accordance with various aspects as described herein.

FIG. 7 illustrates one embodiment of a method 700 by a second network node of monitoring a characteristic of a waste container operation via a sensor node co-located with a waste container in accordance with various aspects as described herein. In FIG. 7, the method 700 may start, for instance, at block 701 where it includes receiving, from a first network node, an indication of an available capacity of a waste container to hold waste determined from an image representing a perspective view of an interior of the container. At block 703, the method 700 may include sending, to a client node, an indication to confirm whether a task can be scheduled. At block 705, the method 700 may include receiving, from the client node, an indication that the task can be scheduled. At block 707, the method 700 may include determining to schedule the task based on the image responsive to receiving the indication that the task can be scheduled.

Figure 8:
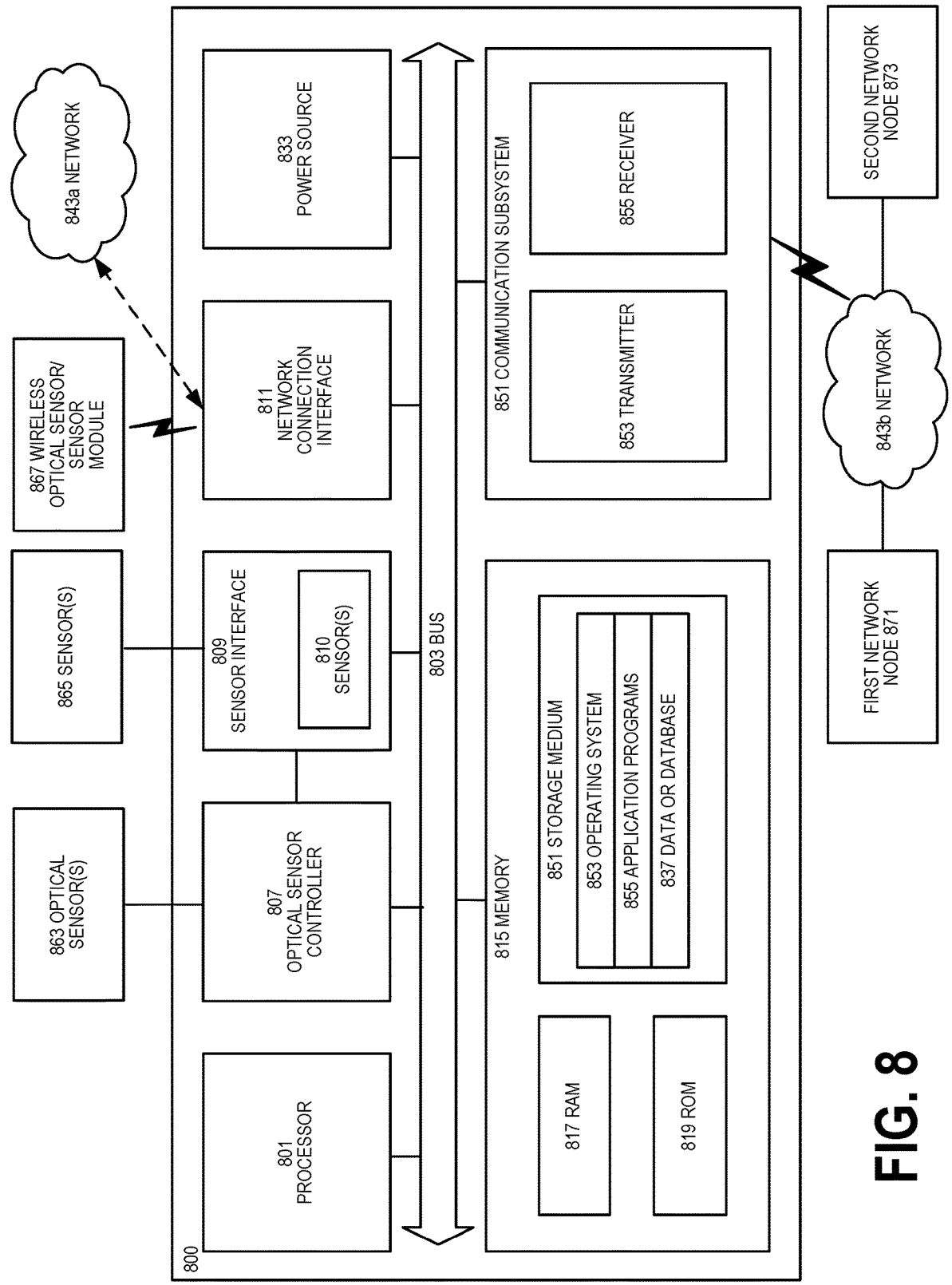
FIG. 8 illustrates one embodiment of a sensor node in accordance with various aspects as described herein.

FIG. 8 illustrates one embodiment of a sensor node in accordance with various aspects as described herein. In FIG. 8, the sensor node 800 may be configured to include a processor 801 that is operatively coupled to a radio frequency (RF) interface 809, a network connection interface 811, a memory 815 including a random access memory (RAM) 817, a read only memory (ROM) 819, a storage medium 831 or the like, a communication subsystem 851, a power source 833, another component, or any combination thereof. The memory 815 may be used to store one or more databases. The storage medium 831 may include an operating system 833, an application program 835, data or database 837, or the like. Specific devices may utilize all of the components shown in FIG. 8, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 8, the processor 801 may be configured to process computer instructions and data. The processor 801 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 801 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 8, the RF interface 809 may be configured to provide a communication interface to RF components such as a transmitter, a receiver, and an antenna. The network connection interface 811 may be configured to provide a communication interface to a network 843a. The network 843a may encompass wired and wireless communication networks such as a local-area network (LAN), a wide-area network (WAN), a computer network, a wireless network, a telecommunications network, another like network or any combination thereof. For example, the network 843a may be a Wi-Fi network. The network connection interface 811 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 811 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 817 may be configured to interface via the bus 803 to the processor 801 to provide storage or caching of data or computer instructions during the execution of software programs such as the operating system, application programs, and device drivers. The ROM 819 may be configured to provide computer instructions or data to the processor 801. For example, the ROM 819 may be configured to be invariant low-level system code or data for basic system functions such as basic input and output (I/O), startup, or reception of keystrokes from a keyboard that are stored in a non-volatile memory. The storage medium 831 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 831 may be configured to include an operating system 833, an application program 835 such as a web browser application, a widget or gadget engine or another application, and a data file 837.

In FIG. 8, the processor 801 may be configured to communicate with a network 843b using the communication subsystem 851. The network 843a and the network 843b may be the same network or networks or different network or networks. The communication subsystem 851 may be configured to include one or more transceivers used to communicate with the network 843b. The one or more transceivers may be used to communicate with one or more remote transceivers of another sensor node or sensor device according to one or more communication protocols known in the art or that may be developed, such as IEEE 802.xx, CDMA, WCDMA, GSM, LTE, NR, NB IoT, UTRAN, WiMax, LoRa, or the like.

In another example, the communication subsystem 851 may be configured to include one or more transceivers used to communicate with one or more remote transceivers of another sensor node or sensor device according to one or more communication protocols known in the art or that may be developed, such as IEEE 802.xx, CDMA, WCDMA, GSM, LTE, NR, NB IoT, UTRAN, WiMax, LoRa, or the like. Each transceiver may include a transmitter 853 or a receiver 855 to implement transmitter or receiver functionality, respectively, appropriate to the RAN links (e.g., frequency allocations and the like). Further, the transmitter 853 and the receiver 855 of each transceiver may share circuit components, software, or firmware, or alternatively may be implemented separately.

In the current embodiment, the communication functions of the communication subsystem 851 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 851 may include cellular communication, Wi-Fi communication, Bluetooth communication, and GPS communication. The network 843b may encompass wired and wireless communication networks such as a local-area network (LAN), a wide-area network (WAN), a computer network, a wireless network, a telecommunications network, another like network or any combination thereof. For example, the network 843b may be a cellular network, a Wi-Fi network, and a near-field network. The power source 813 may be configured to provide an alternating current (AC) or direct current (DC) power to components of the sensor node 800.

In FIG. 8, the storage medium 831 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 831 may allow the sensor node 800 to access computer-executable instructions, application programs or the like, stored on transitory or non-transitory memory media, to off-load data, or to upload data. An article of manufacture, such as one utilizing a communication system may be tangibly embodied in storage medium 831, which may comprise a computer-readable medium.

The functionality of the methods described herein may be implemented in one of the components of the sensor node 800 or partitioned across multiple components of the sensor node 800. Further, the functionality of the methods described herein may be implemented in any combination of hardware, software or firmware. In one example, the communication subsystem 851 may be configured to include any of the components described herein. Further, the processor 801 may be configured to communicate with any of such components over the bus 803. In another example, any of such components may be represented by program instructions stored in memory that when executed by the processor 801 performs the corresponding functions described herein. In another example, the functionality of any of such components may be partitioned between the processor 801 and the communication subsystem 851. In another example, the non-computative-intensive functions of any of such components may be implemented in software or firmware and the computative-intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 9:
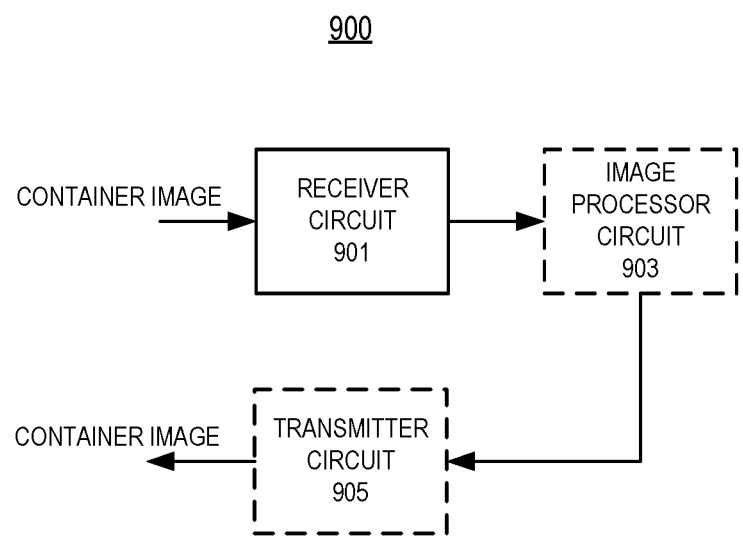
FIG. 9 illustrates another embodiment of a sensor node in accordance with various aspects as described herein.

FIG. 9 illustrates another embodiment of a sensor node 900 in accordance with various aspects as described herein. In FIG. 9, the sensor node 900 includes a receiver circuit 901, an image processor circuit 903, a transmitter circuit 905, the like, or any combination thereof. The receive circuit 901 is operable to receive, from an optical sensor operationally coupled to the sensor node, an image representing a perspective view of the interior of a waste container. The image processor circuit 903 is operable to process the image to at least reduce the memory or file size of the image. The transmitter circuit 905 is operable to send, to a first network node, the image.

Figure 10:
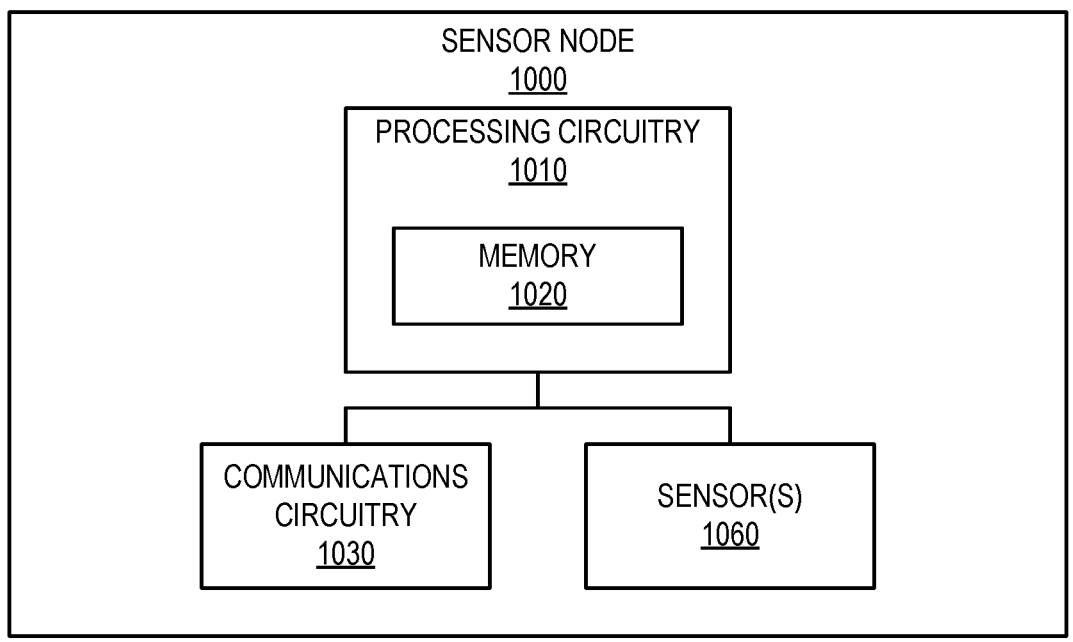
FIG. 10 illustrates another embodiment of a sensor node in accordance with various aspects as described herein.

FIG. 10 illustrates another embodiment of a sensor node 1000 in accordance with various aspects as described herein. In FIG. 10, the sensor node 1000 includes processing circuitry 1010 that is operably coupled to one or more of the following: communications circuitry 1030 and one or more sensors 1060 (e.g., optical sensor), the like, or any combination thereof. The communication circuitry 1030 is configured to transmit and/or receive information to and/or from one or more other nodes via any communication technology. The processing circuitry 1010 is configured to perform processing described herein, such as by executing instructions stored in memory 1020. The processing circuitry 1010 in this regard may implement certain functional means, units, or modules.

FIG. 11 illustrates one embodiment of a method 1100 by a sensor node of monitoring a characteristic of a waste container operation in accordance with various aspects as described herein. In FIG. 11, the method 1100 may start, for instance, at block 1101 where it includes receiving, from an optical sensor, an image representing a perspective view of an interior of the container. At block 1103, the method 1100 may process the image to reduce a memory or file size of the image. At block 1105, the method 1100 may send, to a first network node, the image.

Figure 12:
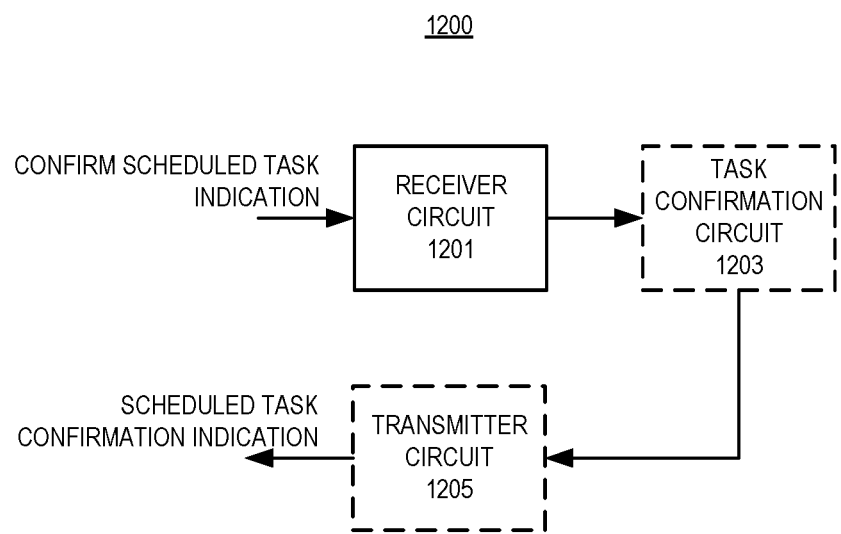
FIG. 12 illustrates one embodiment of a client node in accordance with various aspects as described herein.

FIG. 12 illustrates one embodiment of a client node 1200 in accordance with various aspects as described herein. In FIG. 12, the client node 1200 includes a receiver circuit 1201, a task confirmation circuit 1203, a transmitter circuit 1205, the like, or any combination thereof. The receiver circuit 1201 is operable to receive, from a second network node, an indication to confirm whether to schedule a task associated with a waste container. The task confirmation circuit 1203 is operable to determine whether the second network node should schedule the task. The transmitter circuit 1205 is operable to send, to the second network node, an indication of whether that task should be scheduled.

Figure 13:
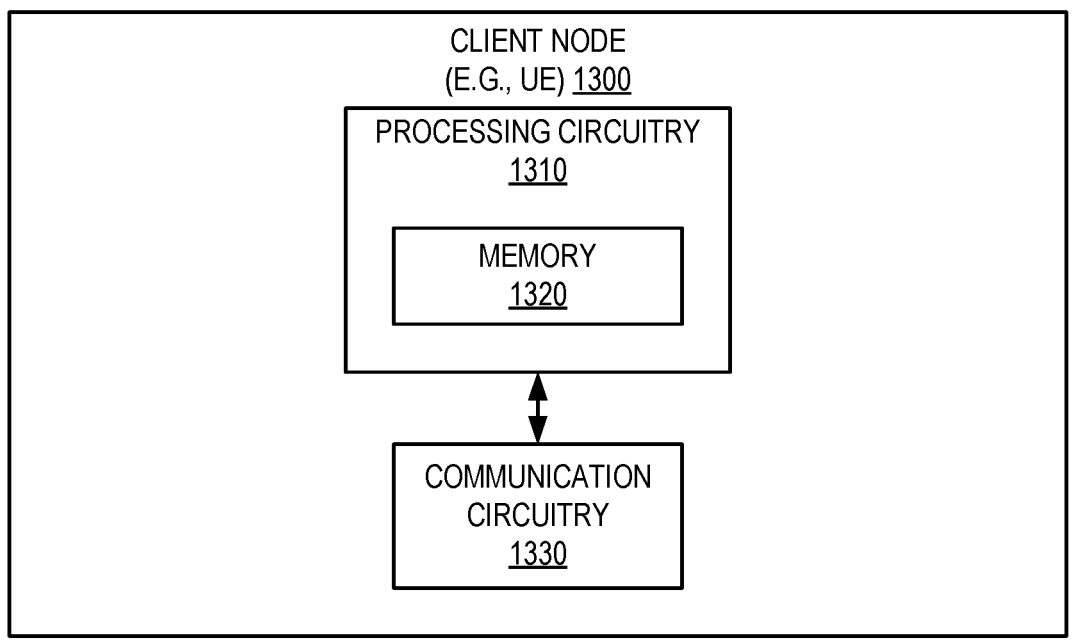
FIG. 13 illustrates another embodiment of a client node in accordance with various aspects as described herein.

FIG. 13 illustrates another embodiment of a client node 1300 in accordance with various aspects as described herein. In FIG. 13, the client node 1300 includes processing circuitry 1310 that is operably coupled to one or more of the following: communications circuitry 1330, or the like. The communication circuitry 1330 is configured to transmit and/or receive information to and/or from one or more other nodes via any communication technology. The processing circuitry 1310 is configured to perform processing described herein, such as by executing instructions stored in memory 1320. The processing circuitry 1310 in this regard may implement certain functional means, units, or modules.

Figure 14:
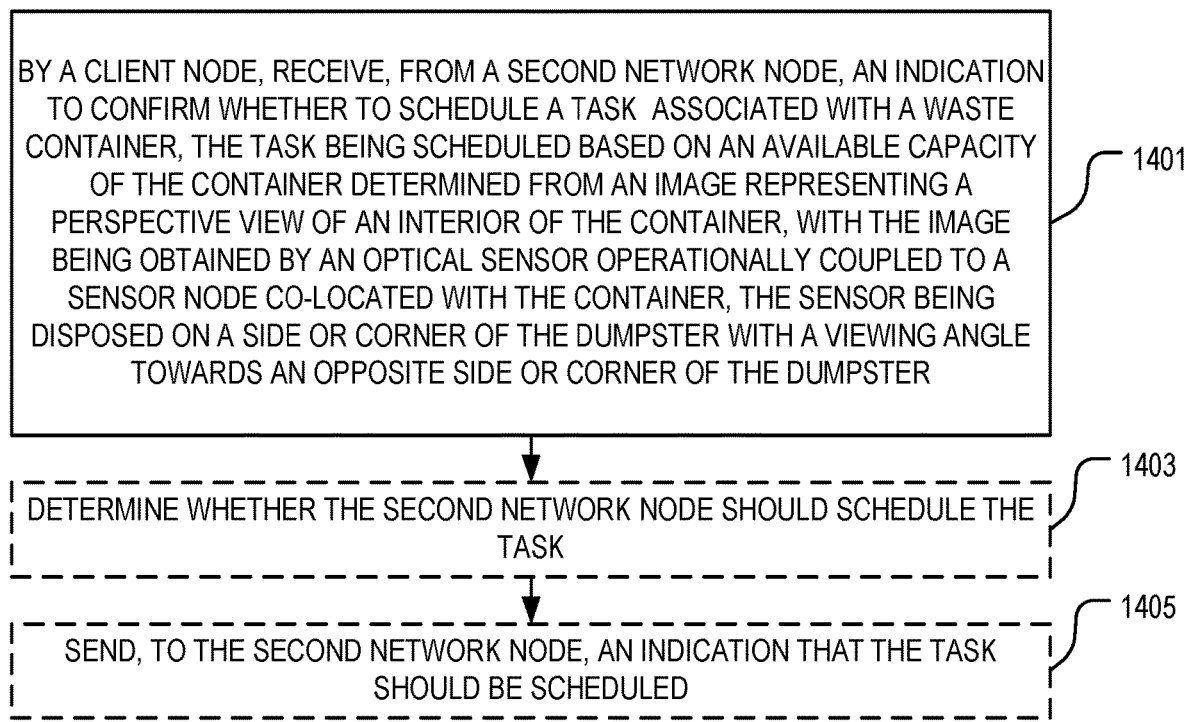
FIG. 14 illustrates one embodiment of a method by a client node of monitoring a characteristic of a waste container operation in accordance with various aspects as described herein.

FIG. 14 illustrates one embodiment of a method 1400 by a client node of monitoring a characteristic of a waste container operation in accordance with various aspects as described herein. In FIG. 14, the method 1400 may start, for instance, at block 1401 where it includes receiving, from a second network node, an indication to confirm whether to schedule a task associated with a waste container. At block 1403, the method 1400 may include determining whether the second network node should schedule the task. At block 1405, the method 1440 may include sending, to the network node, an indication that the task can be scheduled by the second network node.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, nodes (or apparatus), systems, or articles of manufacture that may include a number of components, elements, members, modules, nodes, peripherals, or the like. Further, these methods, nodes, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing node to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, nodes and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing node, carrier, or media. For example, a computer-readable medium may include: a magnetic storage node such as a hard disk, a floppy disk or a magnetic strip; an optical disk such as a compact disk (CD) or digital versatile disk (DVD); a smart card; and a flash memory node such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A node or structure that is "configured" in a certain way is configured in at least that way, but may also be configured in ways that are not listed.

What is claimed is:

1. A method performed by a first network node that is operable to monitor a characteristic of a waste container operation via a sensor node co-located with a waste container, comprising:
   receiving, by the first network node, from the sensor node, an image representing a perspective view of an interior of the container, the first network node being operable to estimate an available capacity of the container to hold waste based on that image so that a second network node is operable to schedule a task associated with the available capacity of the container, with the image being obtained by an optical sensor operationally coupled to the sensor node, the sensor being disposed on one end of an extendable arm of the sensor node, with the sensor node being operable to control the extendable arm so that the sensor can be extended by the extendable arm to obtain an overhead perspective view of the interior of the container with a downwards viewing angle towards an opposite side or corner of the container.

2. The method of claim 1, further comprising:
   estimating the available capacity of the container based on the image.

3. The method of claim 2, wherein said estimating the available capacity includes:
   processing, by a neural network of the first network node, the image to determine an estimate of the available capacity of the container, wherein the neural network is trained by a plurality of interior waste container images having different predetermined available capacities of waste.

4. The method of claim 3, wherein said processing the image is responsive to determining whether all or a portion of the viewing angle of the sensor towards an opposite side or corner of the container is blocked by waste disposed in the container.

5. The method of claim 1, wherein the task includes sending an indication that the container is full of waste.

6. The method of claim 1, wherein the task includes sending an indication that waste disposed in the container can be emptied.

7. The method of claim 1, further comprising:
determining that all or a portion of the viewing angle of the sensor towards an opposite side or corner of the container is blocked by waste disposed in the container.

8. The method of claim 7, further comprising:
sending, by the first network node, to the second network node, an indication that all or a portion of the viewing angle of the sensor towards an opposite side or corner of the container is blocked by waste disposed in the container.

9. The method of claim 1, wherein the task includes sending an indication associated with all or a portion of the viewing angle of the sensor towards an opposite side or corner of the container is blocked by waste disposed in the container.

10. The method of claim 1, wherein the sensor node is operable to extend the extendable arm responsive to determining that all or a portion of the viewing angle of the sensor towards an opposite side or corner of the container is blocked by waste disposed in the container.

11. A first network node that is operable to monitor a characteristic of a waste container operation via a sensor node, comprising:
processing circuitry and memory, the memory containing instructions executable by the processing circuitry whereby the first network node is configured to:
receive, from the sensor node, an image representing a perspective view of an interior of the container, the first network node being operable to estimate an available capacity of the container to hold waste based on that image so that a second network node is operable to schedule a task associated with the available capacity of the container, with the image being obtained by an optical sensor operationally coupled to the sensor node, the sensor being on one end of an extendable arm of the sensor node, with the sensor node being operable to control the extendable arm so that the sensor can be extended by the extendable arm to obtain an overhead perspective view of the interior of the container with a downwards viewing angle towards an opposite side or corner of the container.

12. A method performed by a sensor node, co-located with a waste container, that is operable to monitor a characteristic of a waste container operation, comprising:
sending, by the sensor node, to a first network node, an image captured by an optical sensor operationally coupled to the sensor node and representing a perspective view of an interior of a waste container, the sensor being disposed on one end of an extendable arm of the sensor node, with the sensor node being operable to control the extendable arm so that the sensor can be extended by the extendable arm to obtain an overhead perspective view of the interior of the container with a downwards viewing angle towards an opposite side or corner of the container, the first network node being operable to estimate an available capacity of the waste container to hold waste based on the image.

13. A sensor node, co-located with a waste container, that is operable to monitor a characteristic of a waste container operation, comprising:
processing circuitry and memory, the memory containing instructions executable by the processing circuitry whereby the first network node is configured to:
send, to a first network node, an image captured by an optical sensor operationally coupled to the sensor node and representing a perspective view of an interior of a waste container, the sensor being disposed on one end of an extendable arm of the sensor node, with the sensor node being operable to control the extendable arm so that the sensor can be extended by the extendable arm to obtain an overhead perspective view of the interior of the container with a downwards viewing angle towards an opposite side or corner of the container, the first network node being operable to estimate an available capacity of the waste container to hold waste based on the image.

* * * * *